US008990907B2

(12) United States Patent
Matson et al.

(10) Patent No.: US 8,990,907 B2
(45) Date of Patent: Mar. 24, 2015

(54) MANAGING SECURITY CREDENTIALS FOR SCALED-OUT SERVICES

(71) Applicant: Microsoft Corporation, Redmond, WA (US)

(72) Inventors: David A. Matson, Redmond, WA (US); Kahren Tevosyan, Kirkland, WA (US); Mark Russinovich, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 102 days.

(21) Appl. No.: 13/673,030

(22) Filed: Nov. 9, 2012

(65) Prior Publication Data

US 2014/0137218 A1    May 15, 2014

(51) Int. Cl.
*G06F 21/00* (2013.01)
(52) U.S. Cl.
USPC ............ 726/6; 726/1; 726/5; 726/10; 726/18; 726/27; 713/166; 713/185
(58) Field of Classification Search
USPC ........................................................... 726/6
See application file for complete search history.

(56) References Cited

U.S. PATENT DOCUMENTS

| 7,921,288 | B1 * | 4/2011 | Hildebrand | 713/166 |
|---|---|---|---|---|
| 8,006,280 | B1 * | 8/2011 | Hildebrand et al. | 726/1 |
| 2005/0278278 | A1 * | 12/2005 | Petev et al. | 707/1 |
| 2006/0206932 | A1 * | 9/2006 | Chong | 726/10 |
| 2006/0248598 | A1 * | 11/2006 | Johnson et al. | 726/27 |
| 2006/0259776 | A1 * | 11/2006 | Johnson et al. | 713/185 |
| 2008/0304090 | A1 * | 12/2008 | Shimmoto | 358/1.13 |
| 2009/0070456 | A1 * | 3/2009 | Brown et al. | 709/224 |
| 2009/0234858 | A1 * | 9/2009 | Taylor et al. | 707/10 |
| 2010/0211637 | A1 * | 8/2010 | Borzsei et al. | 709/204 |
| 2011/0302315 | A1 * | 12/2011 | Galvin et al. | 709/228 |
| 2012/0265997 | A1 * | 10/2012 | Laurie et al. | 713/185 |
| 2013/0205360 | A1 * | 8/2013 | Novak et al. | 726/1 |

* cited by examiner

*Primary Examiner* — Yonas Bayou
(74) *Attorney, Agent, or Firm* — Ben Tabor; Sade Fashokun; Micky Minhas

(57) ABSTRACT

Embodiments are directed to establishing separate security identities for a shared service and shared service instances, and to managing shared and service instance credentials. In one scenario, a computer system establishes a shared credential for a shared service that includes multiple shared service instances, where the shared credential uniquely identifies the shared service. The computer system establishes a service instance credential for each shared service instance that uniquely identifies each shared service instance and maintains a relationship between the service instance and the shared service. The relationship provides service instance access to the shared credentials as the shared credentials are updated over time. Then, upon determining that the shared credentials have been updated and are no longer valid, the shared service instance accesses the updated shared credentials using the established relationship.

18 Claims, 5 Drawing Sheets

MANAGING SECURITY CREDENTIALS FOR SCALED-OUT SERVICES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to interact with other software applications or other computer systems. For instance, a virtual private network (VPN) client may allow a user to securely log in to another server to access work-related or other confidential information. In such cases, the VPN client may authenticate the user using a set of credentials (e.g. a user name and password). These credentials allow the user to access the data to which they are entitled. Digital certificates may also be used when authenticating a user. These certificates, however, expire and need to be changed over time. Clients or computer systems attempting to log in using old, expired certificates will be denied access to their data.

BRIEF SUMMARY

Embodiments described herein relate to scaled-out or distributed services. These services may include a single, shared service that is split among multiple different instances. Some of the embodiments are directed to establishing separate security identities for a shared service and shared service instances, and to managing shared and service instance credentials. In one embodiment, a computer system establishes a shared credential for a shared service that includes multiple shared service instances, where the shared credential uniquely identifies the shared service. The computer system establishes a service instance credential for each shared service instance that uniquely identifies each shared service instance and maintains a relationship between the service instance and the shared service. The relationship provides service instance access to the shared credentials as the shared credentials are updated over time. Then, upon determining that the shared credentials have been updated and are no longer valid, the shared service instance accesses the updated shared credentials using the established relationship.

In another embodiment, a shared service instance of a computer system manages its own shared service instance credentials to ensure that the shared service instance credentials remain up to date. The shared service manages shared service credentials for the shared service to which the shared service instances belong, to ensure that the shared service credentials remain up to date. The computer system determines that at least one of the shared service instance credentials and the shared service credentials are to be updated with an update and the shared service instance performs the updates according to the determination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
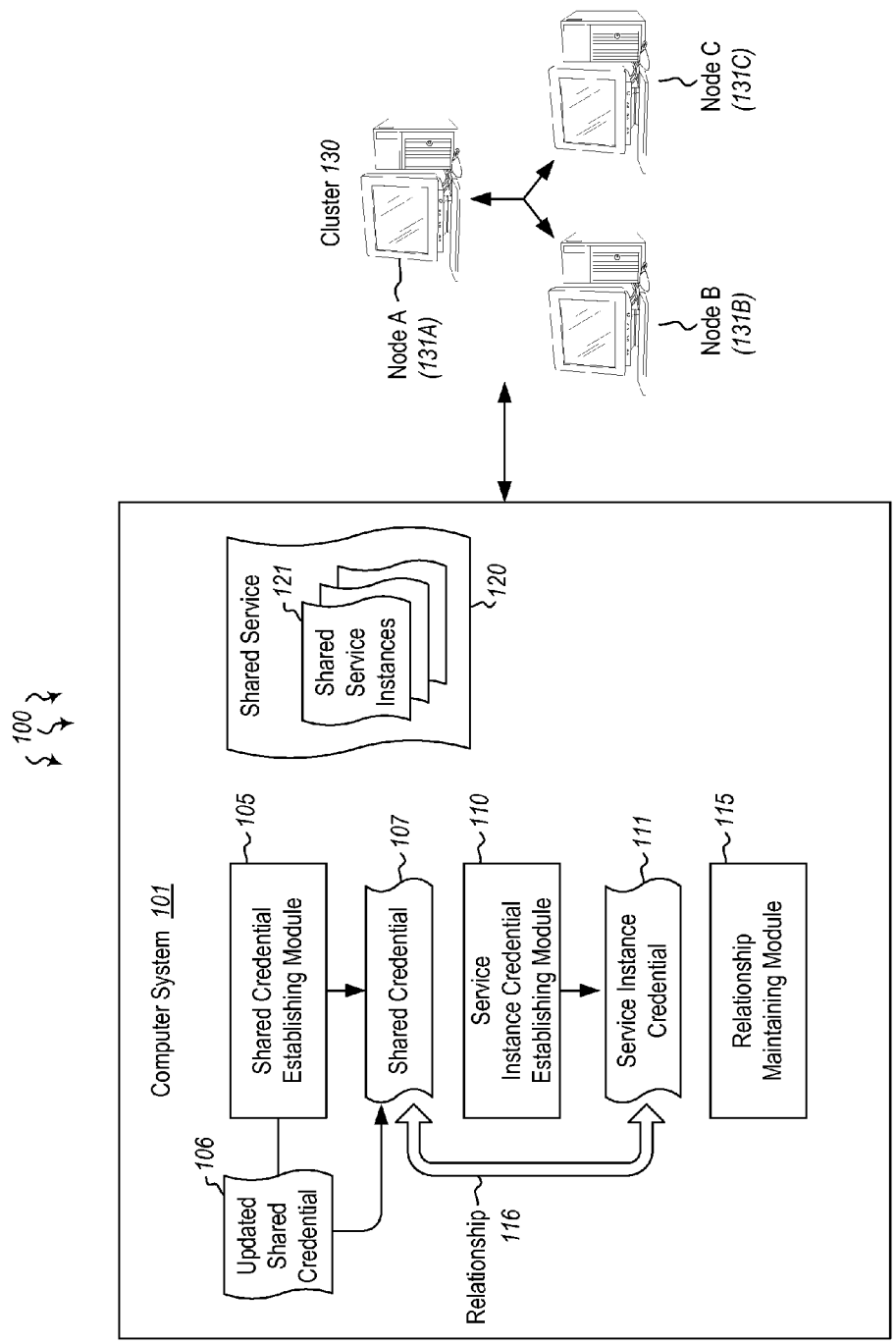
FIG. 1 illustrates a computer architecture in which embodiments described herein may operate including establishing separate security identities for a shared service and one or more shared service instances.

Embodiments described herein are directed to establishing separate security identities for a shared service and shared service instances, and to managing shared and service instance credentials. In one embodiment, a computer system establishes a shared credential for a shared service that includes multiple shared service instances, where the shared credential uniquely identifies the shared service. The computer system establishes a service instance credential for each shared service instance that uniquely identifies each shared service instance and maintains a relationship between the service instance and the shared service. The relationship provides service instance access to the shared credentials as the shared credentials are updated over time. Then, upon determining that the shared credentials have been updated and are no longer valid, the shared service instance accesses the updated shared credentials using the established relationship.

In another embodiment, a shared service instance of a computer system manages its own shared service instance credentials to ensure that the shared service instance credentials remain up to date. The shared service manages shared service credentials for the shared service to which the shared service instances belong, to ensure that the shared service credentials remain up to date. The computer system determines that at least one of the shared service instance credentials and the shared service credentials are to be updated with an update and the shared service instance performs the updates according to the determination.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, a shared credential establishing module 105 (or the shared service instance itself) may be used to establish a shared credential 107 that is shared between a shared service 120 and one or more shared service instances 121. These services may be provided by computer system cluster 130. Each service or service instance may reside on one or more of the cluster's nodes (e.g. 131A, 131B and/or 131C).

Network services are often provided by multiple instances for scalability and reliability (i.e. scale-out architectures). In such architectures, users such as administrators determine how to manage security identity/identities for these services. Embodiments described herein use two kinds of credentials: instance credentials and shared credentials. These credentials are used to manage security identities in an automated and reliable manner. The instance credentials allow securely and uniquely identifying each service instance, and the shared credentials allow identifying services as a whole.

The instance credentials (e.g. 111) provide access to the shared credentials 107. Because they are instance, these credentials can be rolled over independently. Because the instance credentials are managed independently, the instance can preserve its relationship with the shared service even in if it loses its connection with the shared service during times when the shared credentials are changed. In the event of changes to the set of instances (including service healing and disaster recover), the instance can generate new credentials, and the service manager can grant this instance identity the ability to manipulate the shared credentials.

The shared credentials 107 provide the ability for clients to authenticate the service as if it were just one instance (encapsulating the complexity of multiple instances so that the client does not need to know they exist from a security identity standpoint). The shared credentials also allow for persisting cryptographically-protected data without limiting the use of that data to any particular instance. For instance, the shared credentials can be used to encrypt a shared database that all instances can access, or to provide an authenticated token back to a client that is then usable by any instance without requiring "sticky sessions."

An algorithm may be implemented that allows each instance to maintain its own instance credentials, as well as to ensure that the shared credentials are changed as required by policy. This algorithm is designed to function even in the event of extensive outages by one or more instances, and even in the event of any number of shared credential changes.

An entity (e.g. a person or software, hereinafter referred to as a "service manager") may be responsible for managing instances of a shared, scale-out service. A central authority, referred to as a "security token service" can authenticate security identities. Instances of a shared service (e.g. instances 121) have access to some persistence mechanism that supports access control, referred to herein as a "secure shared key repository." This secure shared key repository may, at least in some cases, be implemented as part of the security token service. Trusted channels may be established between the service manager and the security token service, between the service manager and the secure shared key repository, between the service manager and instances of the shared service, between instances of the shared service and the secure shared key repository, and between instances of the shared service and the security token service. Credentials history is often maintained for shared accounts but (at least in some embodiments) not for instance accounts (shared account credentials are generally rolled over in a manner that preserves mutual authentication during the rollover; instance account credentials can simply be changed as needed).

Embodiments described herein include procedures for performing the following: creating a new shared service, adding a new instance to an existing shared service, removing an instance from an existing shared service, removing an entire existing shared service, maintaining instance credentials, maintaining shared credentials, changing instance credentials in an emergency, changing shared credentials in an emergency, rolling over shared credentials in advance of expiration, and recovering an instance whose credentials have been lost. Each procedure will be defined, at least briefly, below.

Creating a New Shared Service: the service manager can create an account for the shared service on the security token service, establishing a name and identity for this shared service. Immediately after creation, credentials do not yet exist for the shared service (no one can yet authenticate as this shared service, nor can anyone yet mutually authenticate to this shared service).

Adding a New Instance to an Existing Shared Service: the service manager instructs the instance to generate a new public/private key pair and to return the public key to the service manager. The instance will use these credentials as its instance credentials. The instance also schedules a uniform credentials maintenance algorithm to run when these credentials are to be updated or otherwise changed. The service manager creates an account for the instance on the security token service, establishing a name and identity for the service instance. The service manager registers this public key with the security token service as the first credentials for the instance's account. The service manager notifies the secure shared key repository that this instance account has access to any keys that are shared among instances of the service. The service manager notifies the instance to schedule the uniform credentials maintenance algorithm for execution.

Removing an Instance from an Existing Shared Service: the service manager notifies the secure shared key repository that the service instance account no longer has access to any keys that are shared among instances of the service. The service manager deletes the instance account on the security token service.

Removing an Entire Existing Shared Service: the service manager follows the procedure to remove any existing instances from the shared service. The service manager deletes the shared key from the secure shared key repository. The service manager deletes the shared service account on the security token service.

Maintaining Instance Credentials: the instance runs the uniform credentials maintenance algorithm (as scheduled by that algorithm).

Maintaining Shared Credentials: The instance runs the uniform credentials maintenance algorithm (as scheduled by that algorithm).

Changing Instance Credentials in an Emergency: This procedure is used in the event that a service manager discovers that an instance's credentials have been disclosed or otherwise compromised. The service manager notifies the instance to schedule the uniform credentials maintenance algorithm for execution and, when executing that algorithm, to change the instance credentials even if they are not expiring or expired.

Changing Shared Credentials in an Emergency: this procedure is used in the event that a service manager discovers that the service's shared credentials have been disclosed or otherwise compromised. The service manager notifies the service instances to schedule the uniform shared credentials maintenance algorithm for execution and, when executing that algorithm, to roll over the shared credentials even if they are not expiring or expired. The service manager notifies the service instances to purge shared credentials history. Each service instance executes the following steps: the instance instructs the security token service to disable any old credentials for the shared account (removing or revoking all shared credentials except the current one), and it instructs the secure shared key repository to purge credentials history for the shared account (removing all shared credentials except the current one).

Rolling Over Shared Credentials in Advance of Expiration: the service manager notifies the service instances to schedule the uniform credentials maintenance algorithm for execution and, when executing that algorithm, to roll over the shared credentials even if they are not expiring or expired.

Recovering an Instance Whose Credentials Have Been Lost: the service manager can follow two procedures in sequence: 1) to remove an instance from an existing shared service, and 2) to add a new instance to an existing shared service. Alternatively, it can perform the following procedure: the service manager instructs the instance to generate a new public/private key pair and to return the public key to the service manager. The instance will use these credentials as its instance credentials, and it schedules the uniform credentials maintenance algorithm to run when these credentials are to be updated or otherwise changed. The service manager registers this public key with the security token service as the current credentials for the instance's account.

Uniform Credentials Maintenance Algorithm: this algorithm is to be executed when 1) requested by the service manager, or 2) as scheduled by the algorithm itself. In either case, to ensure correct behavior in the event of unreliable instances (including the possibility of a power loss at one or more of the cluster nodes (e.g. 131A-C), an instance should persist scheduled algorithm execution times in a reliable mechanism such as a durable queue (where scheduled execution records are not removed until execution has completed successfully). Within the same instance, parallel execution of this algorithm is to be prevented.

When instances generate instance credentials, they persist (locally or remotely) the date on which these credentials are to be updated or changed (referred to herein as an "instance credentials change date"). As indicated in the procedures above, instances may also schedule this algorithm to run on this date. When instances retrieve the private key for shared credentials, they also persist (locally or remotely) the date on which these credentials are to be updated or changed, referred to herein as a "shared credentials change date." Before shared credentials are first retrieved, this date defaults to a fixed date known to be in the past.

Figure 4:
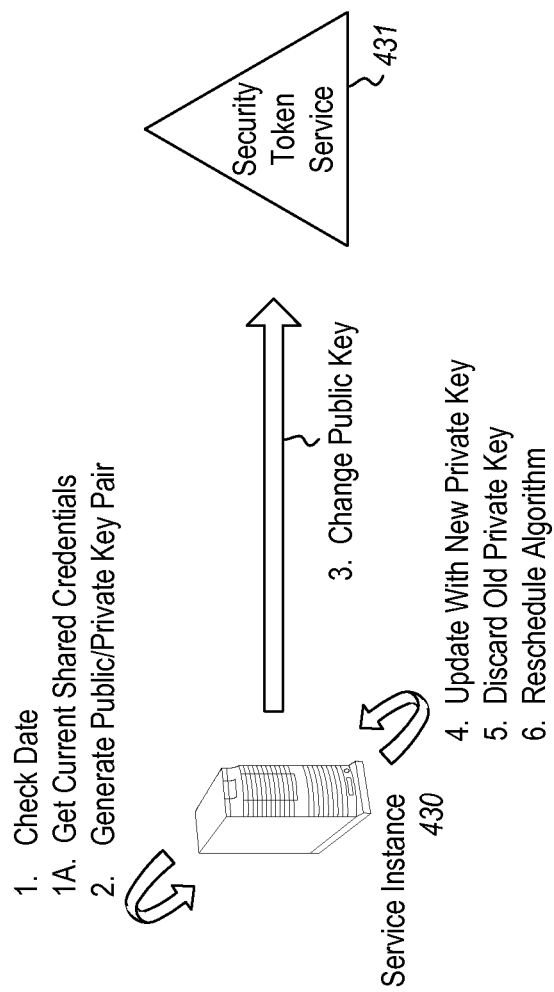
FIG. 4 illustrates an embodiment in which service instance credentials are updated.

The service instance 430 in FIG. 4 compares the current date to the instance credentials change date (in step 1). In cases where shared credentials are being updated, an additional step 1A may be performed that retrieves the current shared credentials. If the instance credential's (or shared credential's) change date has arrived or passed (or if the service manager has instructed it to change instance credentials regardless of the instance credential's change date), the service instance performs the following actions: it generates a new public/private key pair (in step 2 of FIG. 4), it contacts the security token service 431 (using its current private key as credentials) to change its public key to the new public key just generated (step 3), it marks the new private key as its current private key (step 4), it discards the old private key (step 5), and it schedules another instance of this algorithm to run when the instance credentials are to be changed again (step 6) (based on a policy such as "instance credentials should be changed every 30 days").

Figure 5:
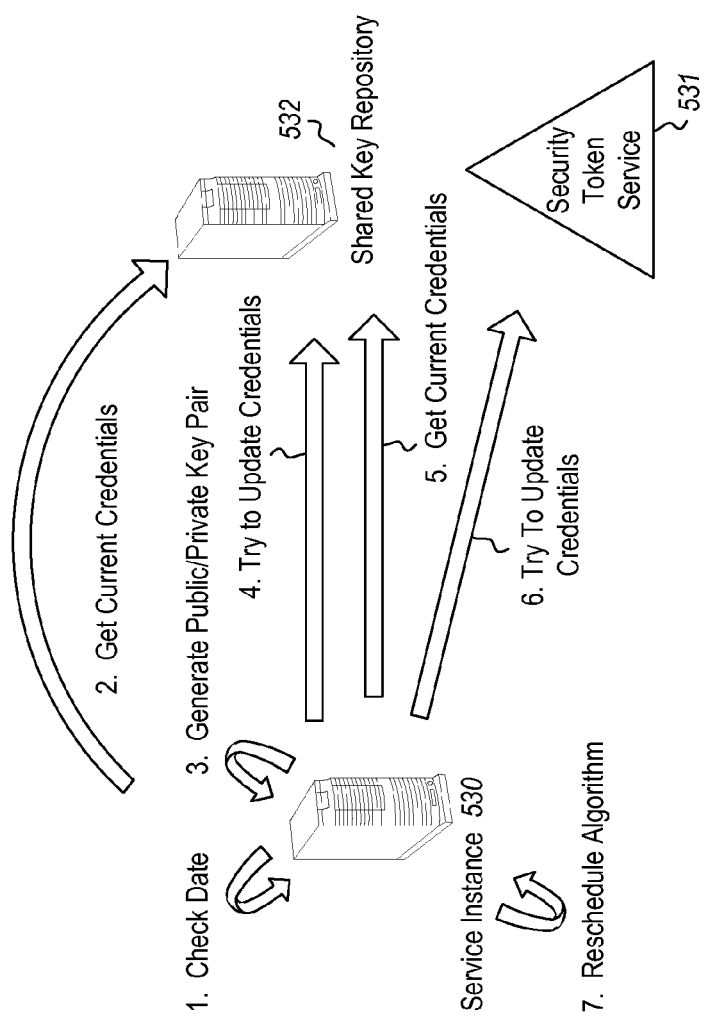
FIG. 5 illustrates an embodiment in which shared service credentials are updated.

In another embodiment, as shown in FIG. 5, the service instance 530 compares the current date to the shared credentials change date (step 1). If the shared credentials change date has arrived or passed (or if the service manager has instructed it to roll over shared credentials regardless of the shared credentials change data), the service instance 530 performs the following actions (using its current instance credentials for authentication): it retrieves the current shared credentials from the secure shared key repository 532 (in step 2). If the shared credentials change date has changed, the service instance skips steps 3 and 4 and proceeds. Service instance 530 generates a new public/private key pair to use as shared instance credentials (in step 3).

Using optimistic concurrency, the service instance 530 races to write this public key as the "official" new shared credentials on the secure shared key repository 532, providing what it thinks is the current shared credentials (or version), and the newly-generated public and private keys. If the instance is the first to write the new credentials to the secure shared key repository, its write attempt will succeed and it will have generated the "official" new shared credentials (step 4). If the instance is not the first, the optimistic concurrency check will fail (the current public key or version will now be different from what the instance provided), because another instance will already have rolled over the credentials. However, in either case, the instance simply discards the public/private key pair it generated and proceeds.

The service instance 530 retrieves the current shared credentials from the secure shared key repository (step 5). It contacts the security token service 531 and checks the current public key registered for the shared service account (step 6). If this public key does not match the public key retrieved from the secure shared key repository, the service instance races to write the new public key as the "official" new shared instance account public key on the security token service, using the same optimistic concurrency approach described in the previous step. It schedules another instance of this algorithm to run when the shared credentials should be changed again (step 7) (based on a policy such as "shared credentials should be changed every 90 days"). These concepts will be explained further below with regard to methods 200 and 300 of FIGS. 2 and 3, respectively.

Figure 2:
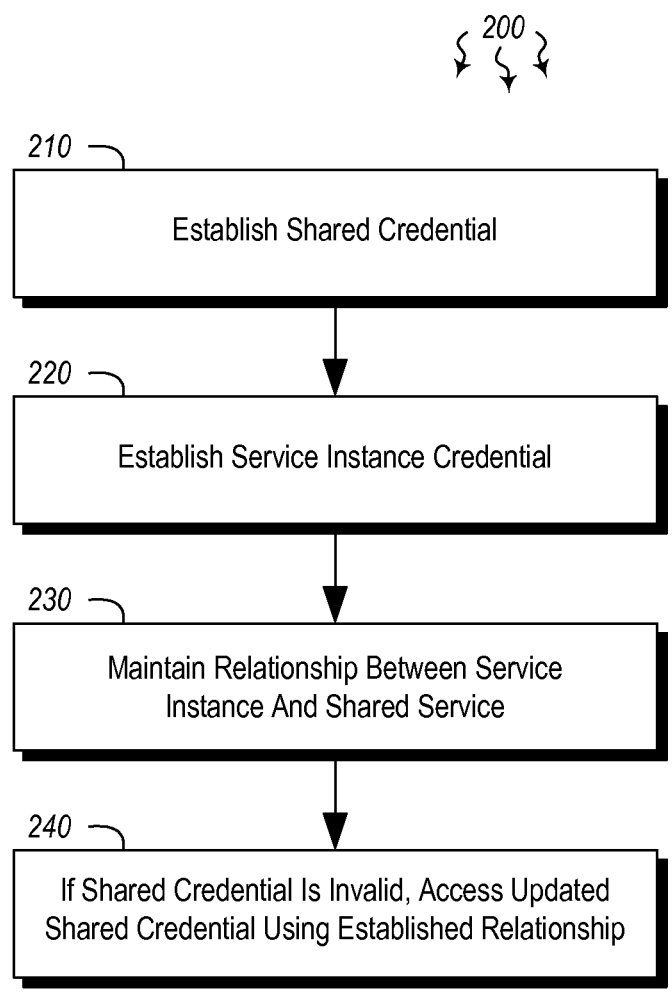
FIG. 2 illustrates a flowchart of an example method for establishing separate security identities for a shared service and one or more shared service instances.
Figure 3:
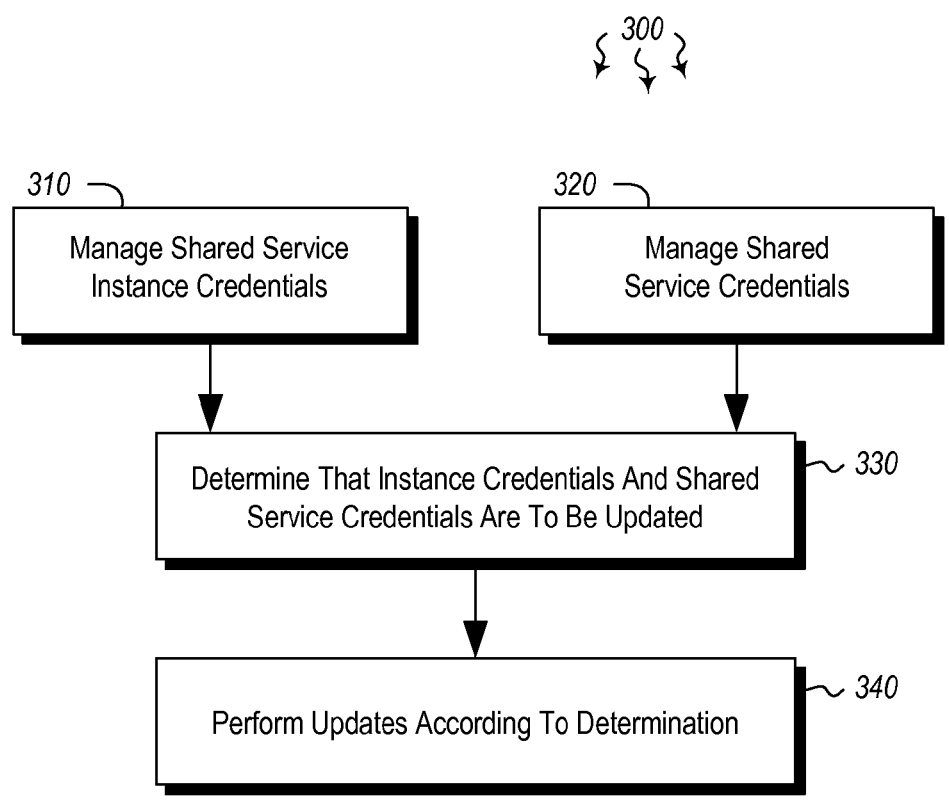
FIG. 3 illustrates a flowchart of an example method for managing shared and service instance credentials.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for establishing separate security identities for a shared service and one or more shared service instances. The method 200 will now be described with frequent reference to the components and data of environment 100 of FIG. 1.

Method 200 includes an act of establishing a shared credential for a shared service that includes a plurality of shared service instances, the shared credential uniquely identifying the shared service (act 210). For example, shared credential establishing module 105 (or the shared service instance itself) may establish shared credential 107 for shared service 120 which itself includes multiple different shared service instances 121. The shared service may be run and executed on the nodes of cluster 130. The shared service and/or the shared service instances may be run on any one or more of the nodes in the cluster (e.g. nodes 131A-C). It will also be understood that cluster 130 may include more or fewer than three nodes as depicted in FIG. 1.

In some embodiments, the shared service 120 may appear as a single service to users that access the shared service. Thus, although the shared service may include multiple service instance, the end user may only be aware of a single application front. The user may use a shared credential (e.g. 107) to access the service 120. The shared credential may, in some cases, be a digital certificate. The digital certificate may be used to authenticate the shared service to the user, so that the user is authenticated to at least one of the service instances using the certificate.

Method 200 also includes an act of establishing a service instance credential for each shared service instance that uniquely identifies each shared service instance (act 220). For example, service instance credential establishing module 110 may establish service instance credential 111 which uniquely identifies each shared service instance 121. The service instance credential may identify which physical computer system the service instance is running on. In this manner, the service instance credential may be used to distinguish among cluster nodes internally. For example, if one node is hacked or has a hard drive failure, the service instance credential may be used to identify that node. The service instance credentials 111 may be replaceable and private. As such, they may be renewed and updated as outlined above with regard to FIGS. 4 and 5.

Method 200 further includes an act of maintaining a relationship between the service instance and the shared service, the relationship providing per instance access to the shared credentials as the shared credentials are updated over time (act 230). Relationship maintaining module 115 of computer system 101 may be used to maintain a relationship 116 between the service instance and the shared service. The relationship allows the shared service instances to access the shared credential 107 using the service instance credential 111, even after the shared credential has been updated or otherwise changed. The relationship 116 between the service instance and the shared service is maintained through connection losses and upgrades. A credentials maintenance algorithm (e.g. the Uniform Credentials Maintenance Algorithm) may be implemented to manage the relationship between the service instance and the shared service. This algorithm is executed upon request by a service manager or as scheduled by the credentials maintenance algorithm itself.

Method 200 also includes, upon determining that the shared credentials have been updated and are no longer valid, an act of the shared service instance accessing the updated shared credentials using the established relationship (act 240). Thus, when the shared credentials have been updated (i.e. 106) and are no longer valid, the shared service instance 121 accesses the updated shared credentials 106 using the relationship 116. In this manner, the shared service instances 121 may access the shared credential 107 or the updated version 106 at any time, as long as the relationship 116 is maintained. In some cases, the service instance credentials 111 may be independently updated to a newer version. Updated shared credentials may be accessed using the instance credentials and the established relationship. Accordingly, if a service instance goes down (e.g. because of a bad hard disk) and the credentials change while it is down, that service instance can access the latest shared credentials using the old instance credentials. Other methods of managing credentials will be described with regard to FIG. 3.

FIG. 3 illustrates a flowchart of a method 300 for managing shared and service instance credentials. The method 300 will now be described with frequent reference to the components and data of environment 100 of FIG. 1.

Method 300 includes an act of a shared service instance managing one or more of its own shared service instance credentials to ensure that the shared service instance credentials remain up to date (act 310). For example, shared service instance 121 may manage its own service instance credentials 111. The shared service instance can take active steps to ensure that its service instance credentials remain up to date. The shared service 120 may also manage shared service credentials 107 for the shared service to which the shared service instances belong, to ensure that the shared service credentials remain up to date (act 320). Accordingly, each of the shared service instances and the shared service itself may each manage their own service and shared credentials.

Method 300 further includes an act of determining that at least one of the shared service instance credentials and the shared service credentials are to be updated with one or more updates (act 330). For instance, in cases where the credentials are digital certificates, these certificates may expire on a certain date and may be updated with newer (unexpired) certificates. Once it is determined that an update is to be performed, the shared service instance 121 may perform the updates according to the determination (act 340).

In some cases, the shared credential may be used to encrypt one or more portions of data used by the shared service 120 or one of its instances 121. The encrypted data portions are accessible from at least one of the shared service instances, and may be accessible by specified individual instances or groups of instances. In some embodiments, the shared credential may be used to encrypt a shared database that is accessible by multiple different shared service instances. As mentioned above with regard to FIGS. 4 and 5, computer system 101 may be used to generate a new public/private key pair for the shared credential, and optimistic concurrency may be used to propagate the public/private key as a new shared credential 107 among the shared services. The public/private key may be stored in a shared key repository (e.g. 532 of FIG. 5) that is a master repository for the computer system. The new public/private key pair may thus be used as an updated shared credential 106. Thus, in this manner, shared credentials may be established and maintained for shared services and their corresponding service instances.

Accordingly, methods, systems and computer program products are provided which establish separate security identities for a shared service and one or more shared service instances. Moreover, methods, systems and computer program products are provided which manage shared and service instance credentials to ensure that the shared service and instance credentials remain up to date.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, causes the computing system to perform a method for establishing separate security identities for a shared service and one or more shared service instances, the method comprising the following:
an act of establishing a shared credential for a shared service that includes a plurality of shared service instances, the shared credential uniquely identifying the shared service;
an act of establishing a service instance credential for each shared service instance that uniquely identifies each shared service instance;
an act of maintaining a relationship between the service instance and the shared service, the relationship providing the service instance access to the shared credential as the shared credential is updated over time, and wherein a credentials maintenance algorithm is implemented to manage the relationship between the service instance and the shared service; and
upon determining that the shared credential has been updated and is no longer valid, an act of the shared service instance accessing the updated shared credential using the service instance credentials and the maintained relationship between the service instance and the shared service.

2. The computer system of claim 1, wherein the service instance credentials are independently updated to a newer version.

3. The computer system of claim 1, wherein the shared service appears as a single service to users that access the shared service.

4. The computer system of claim 3, wherein the shared credential comprises a certificate.

5. The computer system of claim 4, wherein the certificate is used to authenticate the shared service to one or more clients.

6. The computer system of claim 5, wherein the one or more clients authenticate at least one of the service instances using the certificate.

7. The computer system of claim 1, wherein the service instance credential identifies which physical computer system the service instance is running on.

8. The computer system of claim 1, wherein the service instance credentials are replaceable and private.

9. The computer system of claim 1, wherein the relationship between the service instance and the shared service is maintained through connection losses and upgrades.

10. The computer system of claim 1, wherein the credentials maintenance algorithm is executed upon request by a service manager or as scheduled by the credentials maintenance algorithm itself.

11. A computer system comprising the following:
one or more processors;
system memory;
one or more computer-readable storage media having stored thereon computer-executable instructions that, when executed by the one or more processors, causes the computing system to perform a method for managing shared and service instance credentials, the method comprising the following:
an act of a shared service instance managing one or more of its own shared service instance credentials to ensure that the shared service instance credentials remain up to date;
an act of the shared service managing one or more shared service credentials for the shared service to which the shared service instances belong, to ensure that the shared service credentials remain up to date;
an act of determining that at least one of the shared service instance credentials and the shared service credentials are to be updated with one or more updates; and
an act of the shared service instance performing the one or more updates according to the determination.

12. The computer system of claim 11, further comprising encrypting one or more portions of data using the shared credential.

13. The computer system of claim 12, wherein the encrypted data portions are accessible from a plurality of the shared service instances.

14. The computer system of claim 12, wherein the shared credential is used to encrypt a shared database that is accessible by a plurality of shared service instances.

15. The computer system of claim 11, wherein a new public/private key pair is generated for the shared credential.

16. The computer system of claim 15, wherein optimistic concurrency is used to propagate the public/private key as a new shared credential.

17. The computer system of claim 16, wherein the public/private key is stored in a shared key repository that is a master repository for the computer system.

18. A computer system comprising the following:
one or more processors;
system memory;
one or more computer-readable storage media having stored thereon computer-executable instructions that, when executed by the one or more processors, causes the computing system to perform a method for managing shared and service instance credentials, the method comprising the following:
an act of a shared service instance managing one or more of its own shared service instance credentials to ensure that the shared service instance credentials remain up to date;
an act of the shared service instance managing one or more shared service credentials for the shared service to which the shared service instances belong, to ensure that the shared service credentials remain up to date;
an act of determining that at least one of the shared service instance credentials and the shared service credentials are to be updated with one or more updates;
an act of the shared service instance performing the one or more updates according to the determination; and
an act of encrypting one or more portions of data using the shared credential, wherein the encrypted data portions are accessible from a plurality of the shared service instances.

* * * * *